(12) United States Patent
Long

(10) Patent No.: US 8,333,526 B2
(45) Date of Patent: Dec. 18, 2012

(54) THREE DEGREE OF FREEDOM UNIVERSAL JOINT

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 218 days.

(21) Appl. No.: 12/948,734

(22) Filed: Nov. 17, 2010

(65) Prior Publication Data

US 2012/0087718 A1    Apr. 12, 2012

(30) Foreign Application Priority Data

Oct. 11, 2010    (CN) .......................... 2010 1 0502738

(51) Int. Cl.
*F16D 3/00*    (2006.01)
(52) U.S. Cl. .......................................... 403/57; 464/136
(58) Field of Classification Search .................... 403/57, 403/58, 53, 74; 464/136, 128, 132; 74/490.01, 74/490.05; 384/452, 455
See application file for complete search history.

(56) References Cited

U.S. PATENT DOCUMENTS

| | | | | |
|---|---|---|---|---|
| 2,813,409 A * | 11/1957 | Wolcott | ......................... | 464/102 |
| 3,232,076 A * | 2/1966 | Sundt | .............................. | 464/79 |
| 3,300,258 A * | 1/1967 | Kompanek, Jr. et al. | ..... | 384/280 |
| 5,062,730 A * | 11/1991 | Tomii et al. | ..................... | 403/57 |
| 5,469,931 A * | 11/1995 | Kawata et al. | ................ | 180/379 |
| 6,287,206 B1 * | 9/2001 | Stage | ............................ | 464/119 |
| 6,631,653 B2 * | 10/2003 | Brickner et al. | ......... | 74/471 XY |
| 2008/0108446 A1 * | 5/2008 | Faude | ............................ | 464/136 |
| 2009/0041535 A1 * | 2/2009 | Hu | .................................. | 403/57 |
| 2009/0170615 A1 * | 7/2009 | Horwath et al. | ............. | 464/136 |

* cited by examiner

Primary Examiner — Michael P Ferguson
Assistant Examiner — Daniel Wiley
(74) Attorney, Agent, or Firm — Altis Law Group, Inc.

(57) ABSTRACT

A 3DOF universal joint includes a first connecting base, a second connecting base, a two-way hinged member, and a third connecting base. The first connecting base and the second connecting base are rotatably mounted together via the two-way hinged member along a first axis and a second axis substantially perpendicular to the first axis. The third connecting base is rotatably assembled to the second connecting base along a third axis substantially perpendicular to the first and second axes.

9 Claims, 6 Drawing Sheets

THREE DEGREE OF FREEDOM UNIVERSAL JOINT

BACKGROUND

1. Technical Field

The present disclosure relates to universal joints, and particularly, to a three degree of freedom universal joint.

2. Description of Related Art

Generally, a common universal joint has two degrees of freedom. However, in some complicated and multi-degree of freedom mechanisms such as industrial robots, multi-degree of freedom universal joints are needed to connect and control the robot arms to fulfill complicated movements or operations. What is more, the common universal joint has a complicated structure and large volume that occupies a relative large space.

Therefore, there is a room for improved in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the three degree of freedom universal joint. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
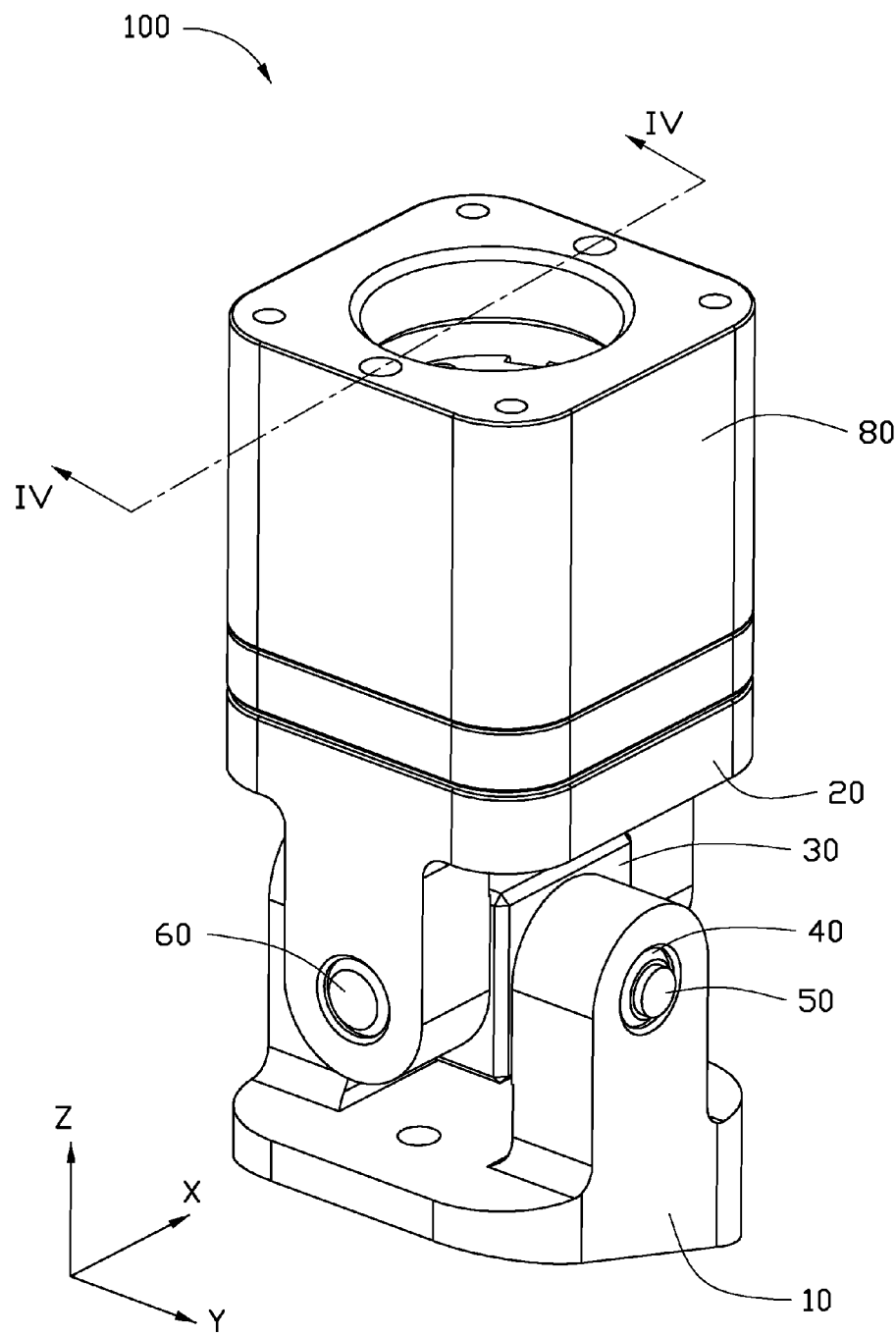
FIG. 1 is an assembled isometric view of an embodiment of a three degree of freedom universal joint, the three degree of freedom universal joint including a first connecting base, a second connecting base, a two-way hinged member, and a third connecting base.

Referring to FIG. 1, an embodiment of a three degrees of freedom (3DOF) universal joint 100 is shown. The 3DOF universal joint 100 includes a first connecting base 10, a second connecting base 20, a two-way hinged member 30, two pivotal shafts 40, a connecting pin 50, a pin shaft 60, and a third connecting base 80. The first connecting base 10 and the second connecting base 20 are rotatably mounted together via the two-way hinged member 30, the two pivotal shafts 40, the connecting pin 50 and the pin shaft 60, along a first axis (namely the X axis shown in FIG. 1) and a second axis (namely the Y axis shown in FIG. 1) substantially perpendicular to the first axis. The third connecting base 80 is rotatably assembled to the second connecting base 20 along a third axis (namely the Z axis shown in FIG. 1) substantially perpendicular to the first and second axes.

Figure 2:
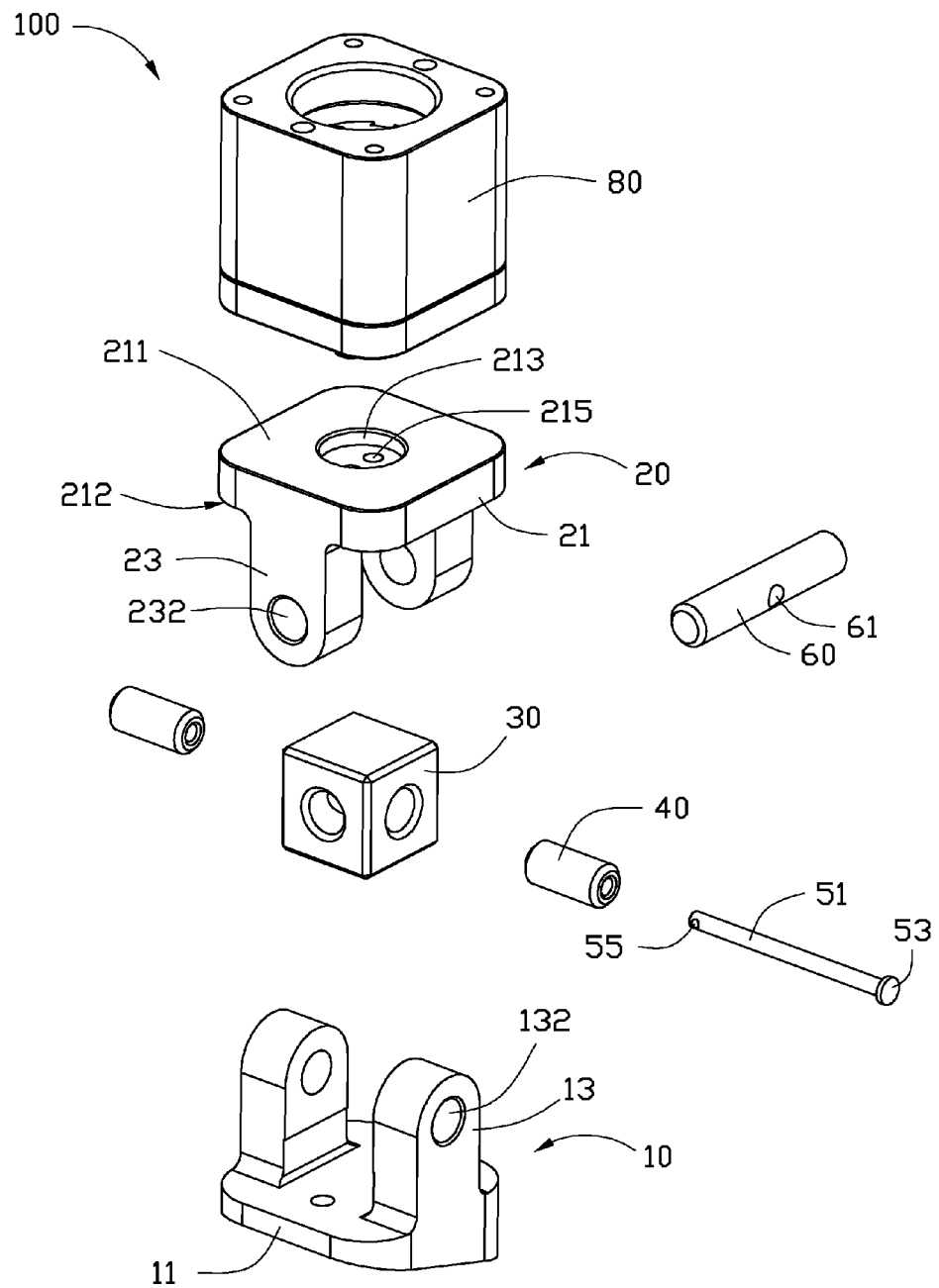
FIG. 2 is an exploded isometric view of the three degree of freedom universal joint shown in FIG. 1.
Figure 3:
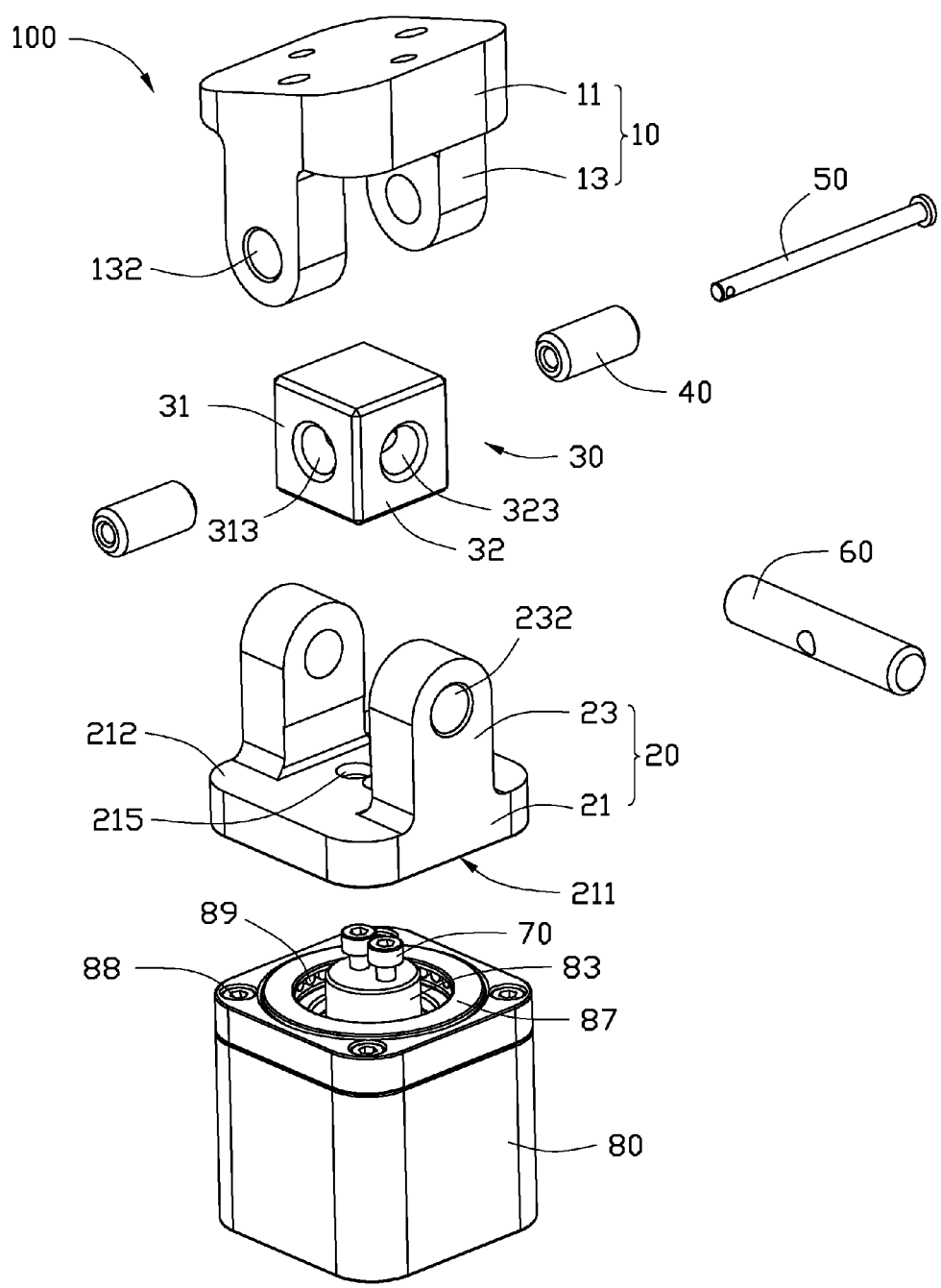
FIG. 3 is similar to the FIG. 2, but viewed from another aspect.

Also referring to FIGS. 2 and 3, the first connecting base 10 is substantially U-shaped, and includes a base body 11 and two hinge blocks 13 formed on the base body 11 and spaced from each other. The two hinge blocks 13 each define a hinge hole 132 aligned with each other.

The second connecting base 20 has substantially the same shape as that of the first connecting base 10, and includes a baseboard 21 and two hinge blocks 23 formed on the baseboard 21 and spaced from each other. The baseboard 21 includes an upper surface 211 and a bottom surface 212 opposite to the upper surface 211. A substantially cylindrical assembly hole 213 is defined in a center portion of the upper surface 211. Two fixing holes 215 are defined through a center portion of the bottom surface 212 to communicate with the assembly hole 213. Two hinge blocks 23 are formed on the bottom surface 212 and positioned adjacent to two sides of the base body 11, corresponding to the two hinge blocks 13. Each hinge block 23 defines a hinge hole 232. When the first connecting base 10 and the second connecting base 20 are cross-assembled together, the two hinge blocks 13 of first connecting base 10 and the two hinge blocks 23 of the second connecting base 20 cooperatively form a substantially rectangular assembly space (not labeled).

The two-way hinged member 30 is a substantially rectangular block and is assembled within the assembly space formed by the two hinge blocks 13 of the first connecting base 10 and the two hinge blocks 23 of the second connecting base 20, to rotatably connect the first connecting base 10 and the second connecting base 20 together along two substantially perpendicular degree of freedoms. The two-way hinged member 30 includes a first side surface 31 and a second side surface 32 adjacent to the first side surface 31. The first side surface 31 defines a first axial hole 313 and the second side surface 32 defines a second axial hole 323 therethrough. The first axial hole 313 and the second axial hole 323 cross together, thereby forming a cross hole (not labeled) within the two-way hinged member 30.

The two pivotal shafts 40 are two hollow cylindrical shafts, each having a connecting axial hole (not labeled) defined therethrough axially. In assembly, ends of the two pivotal shafts 40 are respectively inserted and connected to the two ends of the first axial hole 313 of the two-way hinged member 30. The other ends of the two pivotal shafts 40 are respectively connected to the hinge hole 132 of the two hinge blocks 13 of the first connecting base 10, such that the first connecting base 10 is rotatably connected to the two-way piece 30.

The connecting pin 50 rotatably passes through the first axial hole 313 of the two-way piece 30 with two ends thereof respectively hinged on the two hinge blocks 13 of the first connecting base 10 via the two pivotal shafts 40. The connecting pin 50 includes a cylindrical pin body 51 and a head portion 53 formed at a distal end of the pin body 51. A stop hole 55 is defined therethrough the other distal of the pin body 51. The diameter of the pin body 51 is substantially the same as that of the axial hole of the pivotal shaft 40.

The pin shaft 60 is substantially cylindrical and includes a pin hole 61 defined through a center portion of the pin shaft 60 thereby enabling the pin body 51 of the connecting pin 50 to pass therethrough. The diameter of the pin hole 61 is substantially the same as that of the pin body 51. In assembly, the pin shaft 60 passes through the second axial hole 323 of the two-way hinged member 30, with two ends thereof exposed from the ends of the second axial hole 323 and hinged on the two hinge blocks 23 of the second connecting base 20.

Figure 4:
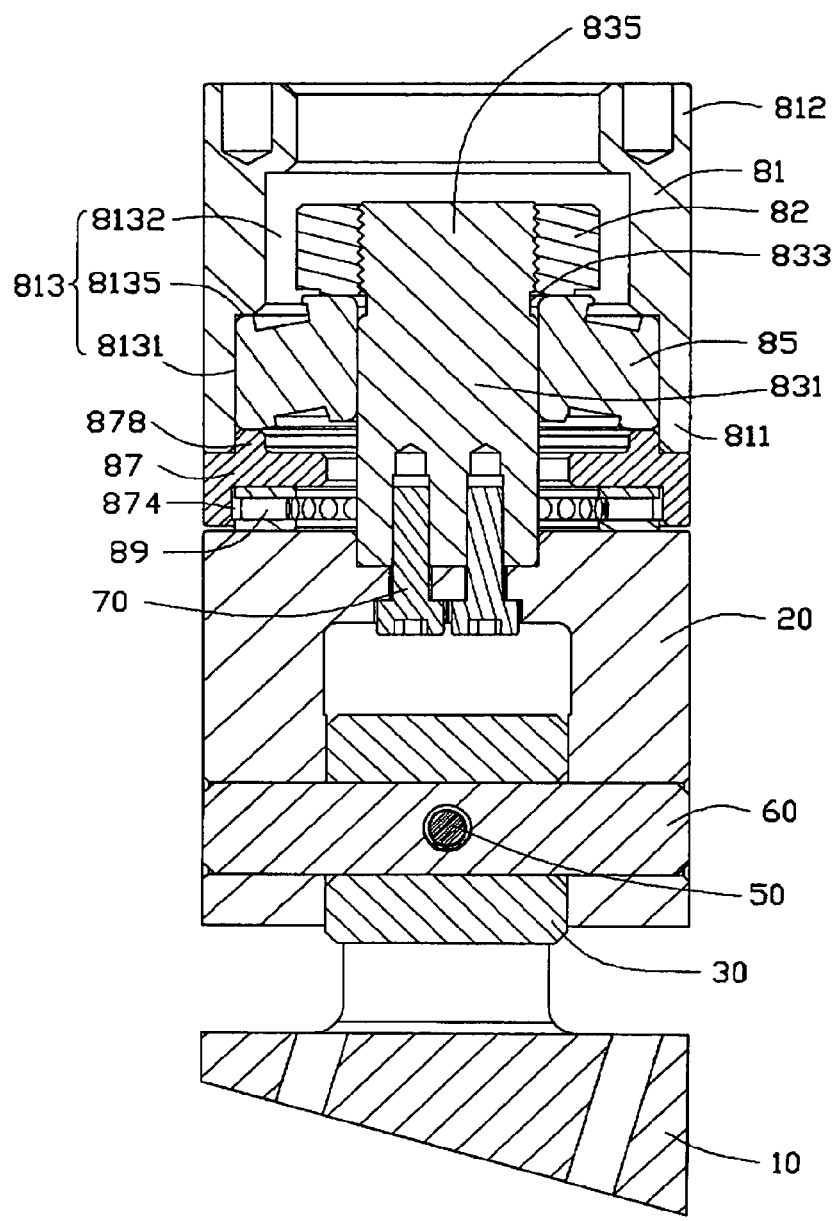
FIG. 4 is a cross-section of the three degree of freedom universal joint of FIG. 1 taken along line IV-IV.
Figure 5:
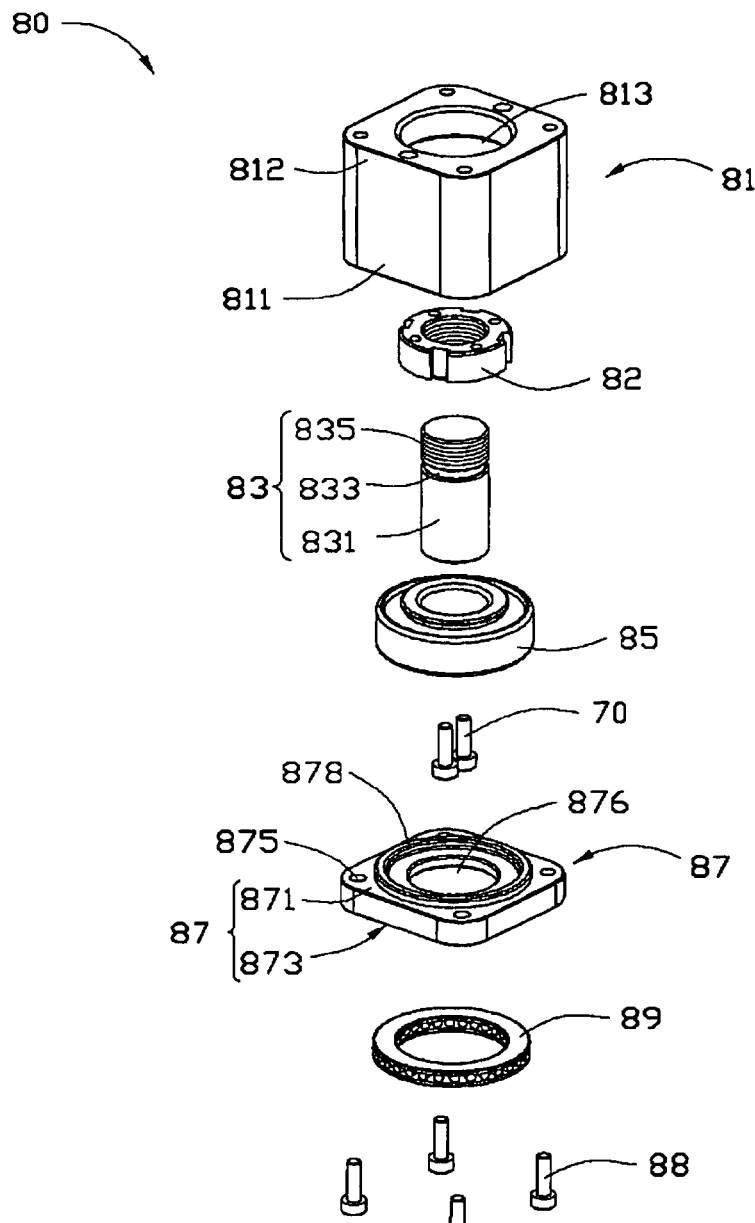
FIG. 5 is an exploded isometric view of the third connecting base shown in FIG. 1.
Figure 6:
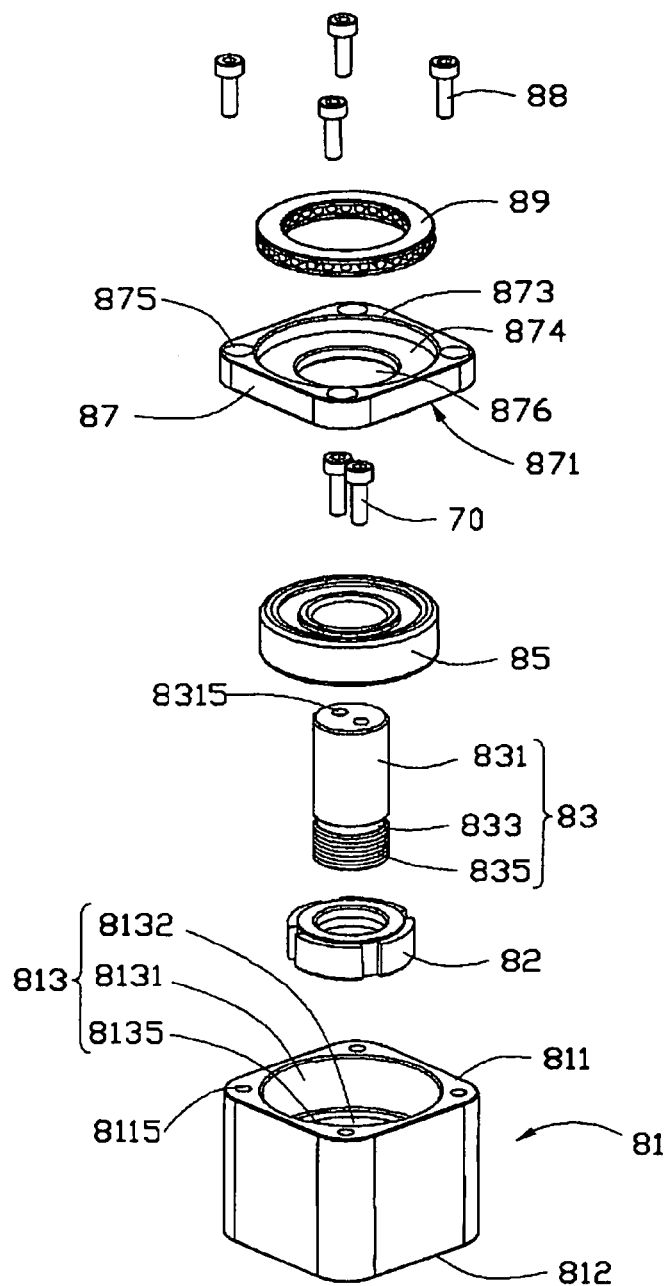
FIG. 6 is similar to the FIG. 5, but viewed from another aspect.

Also referring to FIGS. 5 and 6, the third connecting base 80 includes a main body 81, an adjusting nut 82, a rotary shaft 83, a tapered roller bearing 85, a bearing cover 87, and a thrust needle bearing 89. The main body 81 is a substantially hollow rectangular post, and includes an assembly end 811 and an opposite connecting end 812. Four fixing holes 8115 are respectively defined adjacent to the four corners of the cross section of the assembly end 811. The main body 81 defines a stepped hole 813 with an aperture decreasing inwardly from the assembly end 811 toward the connecting end 812, thereby forming an assembling space 8131 located adjacent to the assembly end 811, an adjusting space 8132 located adjacent to the connecting end 812, and a resisting portion 8135 located at the junction of the assembling space 8131 and the adjusting space 8132 (also shown in FIG. 4).

The rotary shaft 83 is rotatably assembled in the stepped hole 813 of the main body 81 via the tapered roller bearing 85. The rotary shaft 83 includes a main shaft portion 831, a connecting portion 833, and an adjusting shaft portion 835. The main shaft portion 831 and the adjusting shaft portion 835 are positioned at two ends of the connecting portion 833. The diameters of the main shaft portion 831 and the adjusting shaft portion 835 both exceed the connecting portion 833. Two securing holes 8315 are defined in the cross-section of the distal end of the main shaft portion 831, corresponding to the two fixing holes 215 of the second base body 20. The adjusting shaft portion 835 is threaded to enable the adjusting nut 82 to be received thereon.

The tapered roller bearing 85 is rotatably sleeved on the main shaft portion 835 of the rotary shaft 83, and is assembled within the stepped hole 813 of the main body 81 together with the rotary shaft 83. In assembly, the outer peripheral wall of the tapered roller bearing 85 tightly resists the inner wall of the assembling space 8131 of the main body 81. One end of the tapered roller bearing 85 tightly resists the resisting portion 8135 of the main body 81.

The bearing cover 87 is covered on the assembly end 811 of the main body 81 for enveloping the tapered roller bearing 85 within the assembling space 8131 of the main body 81. The bearing cover 87 is substantially rectangular and includes four mounting holes 875 defined therethrough adjacent to four corners thereof, and corresponding to the four fixing holes 8115 of the main body 81. The bearing cover 87 includes a resisting surface 871 and an opposite outer surface 873. The outer surface 873 defines a cylindrical receiving portion 874 therein. An axial hole 876 is defined through the bottom of the receiving portion 874 to enable the distal end of the main shaft portion 831 to pass therethrough to connect with the second connecting base 20. A cylindrical resisting ring 878 protrudes from the resisting surface 871 of the bearing cover 87 and is positioned surrounding the axial hole 876. The diameter of the resisting ring 878 is substantially the same as that of the assembling space 8131.

The thrust needle bearing 89 is assembled within the receiving portion 874 of the bearing cover 87 and sleeved on the corresponding main shaft portion 831 of the rotary shaft 83.

Also referring to FIG. 4, during assembly of the third connecting base 80, the adjusting nut 82 is threaded onto the adjusting shaft 835 of the rotary shaft 83. The tapered roller bearing 85 is sleeved on the main shaft portion 835 of the rotary shaft 83, and is assembled into the stepped hole 813 of the main body 81 with the rotary shaft 83 and the adjusting nut 82, from the assembly end 811. The tapered roller bearing 85 is received within the assembling space 8131 of the stepped hole 813, and the outer peripheral wall of the tapered roller bearing 85 tightly resists against the inner wall of the assembling space 8131 of the main body 81. One end of the tapered roller bearing 85 toward the adjusting nut 82 tightly resists the resisting portion 8135 formed within the stepped hole 813 of the main body 81. The adjusting nut 82 together with the adjusting shaft 835 is received within the corresponding adjusting space 8132 of the stepped hole 813. The bearing cover 87 is covered on the assembly end 811 of the main body 81, with four mounting holes 875 aligning with the corresponding four fixing holes 8115 of the main body 81. The bearing cover 87 is fixed to the main body 81 by four bolts 88, with the resisting ring 878 tightly inserted into and received within the assembling space 8131 of the assembly end 811. The distal end of the main shaft portion 831 of the rotary shaft 83 passes through the axial hole 876 and is exposed. The thrust needle bearing 89 is assembled within the receiving portion 874 of the bearing cover 87 and sleeved on the corresponding distal end of the main shaft portion 831 of the rotary shaft 83 to finish the assembly of the third connecting base 80.

Referring to FIGS. 1, 2 and 3 again, during assembly of the 3DOF universal joint 100, the second connecting base 20 is fixed to the distal end of the main shaft portion 831 of rotary shaft 83 of the third connecting base 80 by two bolts 70. Specifically, the distal end of the main shaft portion 831 is inserted into the assembly hole 213 of the baseboard 21 of the second connecting base 20, with the two securing holes 8315 aligned with the corresponding fixing holes 215. The two bolts 70 respectively pass through the two fixing holes 215 of the baseboard 21, and are secured to the two securing holes 8315 of the main shaft portion 831. The two-way member 30 is assembled between the two hinge blocks 23 of the second connecting base 20, with the second axial hole 323 aligned with the two hinge holes 232 of the two hinge blocks 23. The pin shaft 60 passes through one hinge hole 232, the second axial hole 323, and the other hinge hole 232. The two ends of the pin shaft 60 are hinged on the two hinge holes 232 of the second connecting base 20. The pin hole 61 of the pin shaft 60 aligns with the first axial hole 313. The first connecting base 10 is hinged on the second connecting base 20, with two hinge blocks 13 cross-assembled with the two hinge blocks 23 of the second connecting base 20 and the two hinge holes 132 aligning with the first axial hole 313 of the two-way piece 30. The two pivotal shafts 40 are respectively assembled to the two ends of the first axial hole 313 to hinge the first connecting base 10 with the two-way piece 30. The connecting pin 50 finally penetrates through the two pivotal shafts 40, the first axial hole 313, and the pin hole 61 of the pin shaft 60, to complete assembly of the assembly of the 3DOF universal joint 100.

In use, the first connecting base 10 is rotatably hinged on the second connecting base 20 via the two-way piece 30, such that the first connecting base 10 can be rotated relative to the second connecting base 20 along the first axis and the second axis. The third connecting base 80 is rotatably assembled to the second connecting base 20 along the third axis.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A three-degree-of-freedom universal joint, comprising:
    a first connecting base comprising a base body and two first hinge blocks formed on the base body and spaced from each other, wherein a first axis passes through the two first hinge blocks;
    a second connecting base comprising a baseboard and two second hinge blocks formed on the baseboard and spaced from each other, wherein a second axis passes through the two second hinge blocks;

wherein in an assembled state, the first axis is perpendicular to the second axis, and the first axis intersects the second axis at an assembly space formed between the first hinge blocks and second hinge blocks;

a two-way hinged member disposed within the assembly space and connected to the first and second hinge blocks for hinging the second connecting base relative to the first connecting base about the first axis and the second axis; and a third connecting base rotatably assembled to the baseboard of the second connecting base on a side of the baseboard opposite the second hinge blocks, wherein the third connecting base is rotatable about a third axis that is substantially perpendicular to the first and second axes;

wherein the third connecting base comprises:

a hollow main body, the main body having an assembly end adjacent the baseboard of the second connecting base, and a connecting end opposite the assembly end, said connecting end being adapted to connect to an external device;

a rotary shaft, the rotary shaft having opposite first and second ends, with the first end disposed within the main body and the second end extending outwardly from the assembly end and secured to the baseboard of the second connecting base; and a tapered roller bearing, an inner peripheral wall of the roller bearing being rotatably engaged with the rotary shaft adjacent the first end of the rotary shaft, and an outer peripheral wall of the roller bearing being engaged with an inner wall of the main body.

2. The universal joint of claim 1, wherein the two first hinge blocks each have a hinge hole coaxially aligned with the first axis, and the two second hinge blocks each have a hinge hole coaxially aligned with the second axis, and wherein the universal joint further includes two hollow pivotal shafts and a pin shaft, wherein the two pivotal shafts are respectively inserted into the hinge holes of the two first hinge blocks and extend into the two-way hinged member; and wherein the pin shaft passes through the two-way hinged member, with two ends thereof inserted into the hinge holes of the two second hinge blocks.

3. The universal joint of claim 2, wherein the two-way hinged member comprises a first side surface and a second side surface perpendicular to the first side surface, the first side surface and the second side surface respectively defining a first axial hole coaxially aligned with the first axis and a second axial hole coaxially aligned with the second axis, such that the first axial hole and the second axial hole cross together, thereby forming a cross hole within the two-way hinged member.

4. The universal joint of claim 1, wherein the main body defines a stepped hole extending axially between the assembly end and the connecting end, with an inner dimension of the stepped hole decreasing from the assembly end toward the connecting end, thereby defining an assembling space located adjacent to the assembly end, an adjusting space located adjacent to the connecting end, and a resisting portion located at the junction of the assembling space and the adjusting space; the third connecting base further comprises a bearing cover disposed at the assembly end of the main body.

5. The universal joint of claim 4, wherein the tapered roller bearing is received within the assembling space of the main body, and sandwiched between the bearing cover and the resisting portion.

6. The universal joint of claim 4, wherein the rotary shaft includes a main shaft portion, a connecting portion, and an adjusting shaft portion, wherein the main shaft portion and the adjusting shaft portion are positioned at the first and second ends of the rotary shaft, respectively, on opposite sides of the connecting portion; the tapered roller bearing is rotatably sleeved on the main shaft portion.

7. The universal joint of claim 6, wherein the adjusting shaft portion defines a threaded portion thereon, and the third connecting base further comprises an adjusting nut threaded onto the adjusting shaft portion such that the nut engages the tapered roller bearing.

8. The universal joint of claim 6, wherein the bearing cover includes a resisting surface and an opposite outer surface, the outer surface defines a receiving portion therein and an axial hole through the receiving portion; the main shaft portion of the rotary shaft passes through the axial hole and is fixed to the second connecting base; the third connecting base further comprises a thrust needle bearing sleeved on the main shaft portion and received in the receiving portion of the bearing cover.

9. The universal joint of claim 8, wherein the resisting surface comprises a resisting ring protruding thereon with substantially the same shape as that of the assembling space, such that the resisting ring engages the assembling space of the main body and resists the tapered roller bearing.

\* \* \* \* \*